April 7, 1964  L. T. HARRIS  3,128,130
LINK FOR CRAWLER TRACK
Filed Sept. 21, 1962  2 Sheets-Sheet 1
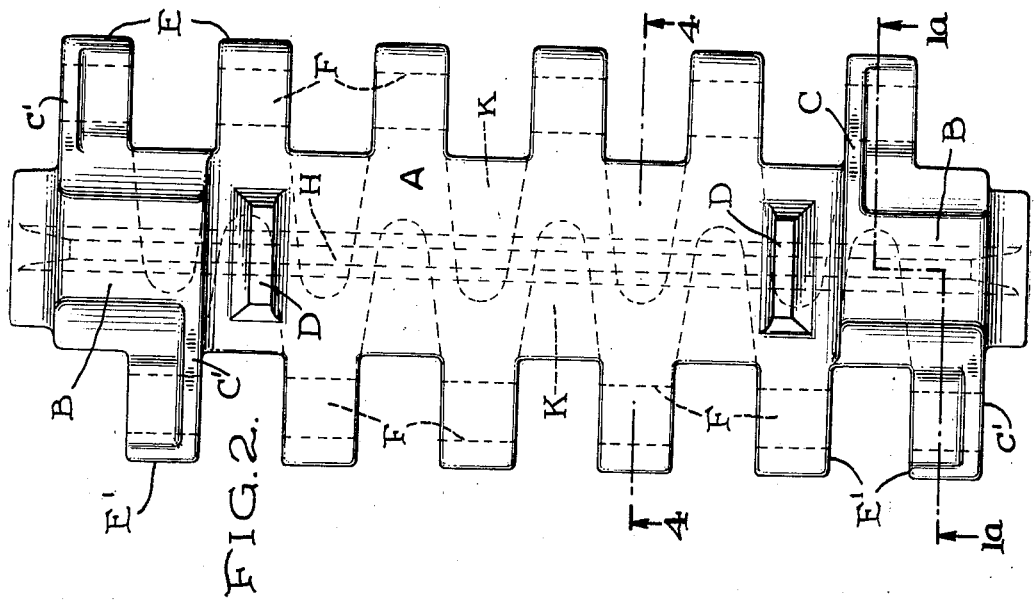
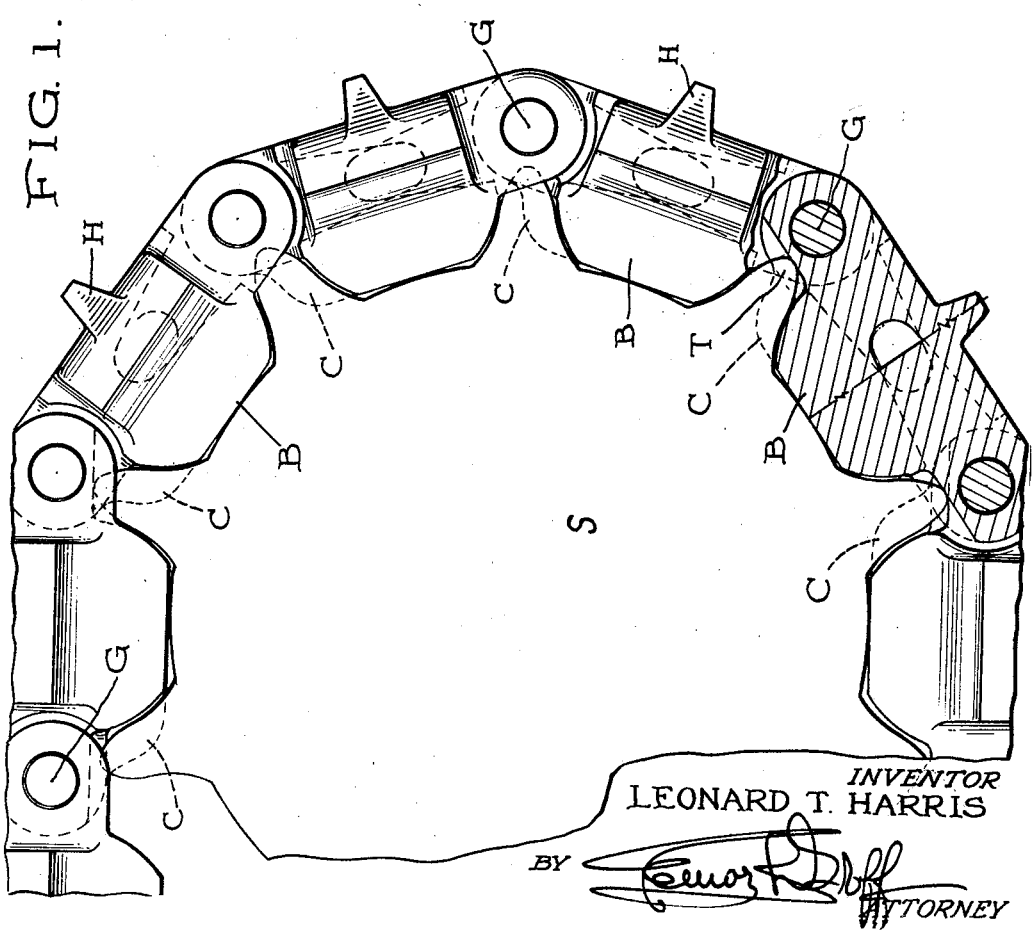
INVENTOR
LEONARD T. HARRIS
BY
ATTORNEY April 7, 1964 L. T. HARRIS 3,128,130
LINK FOR CRAWLER TRACK
Filed Sept. 21, 1962 2 Sheets-Sheet 2
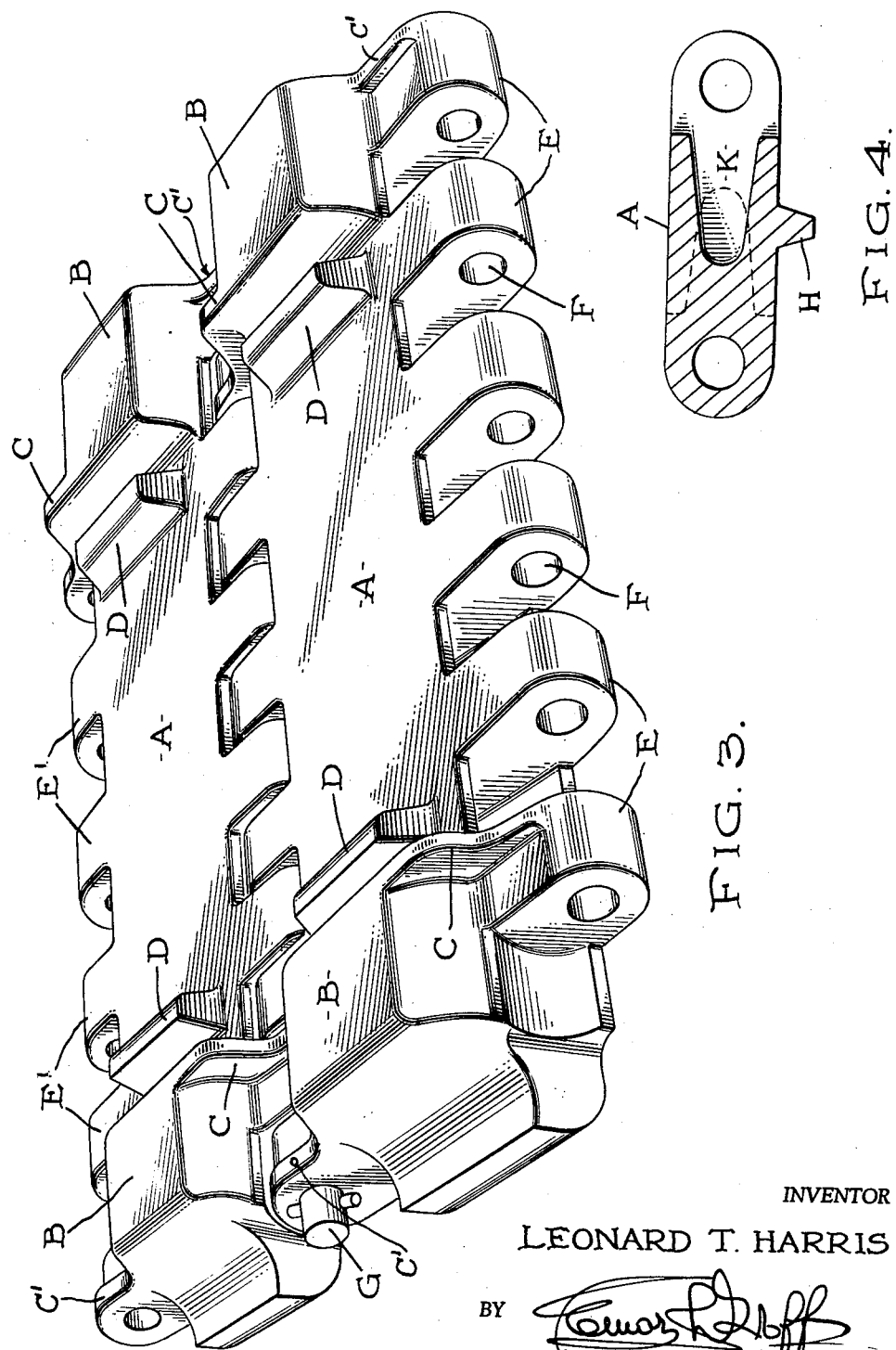
INVENTOR
LEONARD T. HARRIS
BY
ATTORNEY

United States Patent Office 3,128,130
Patented Apr. 7, 1964

3,128,130
LINK FOR CRAWLER TRACK
Leonard T. Harris, Chicago Heights, Ill., assignor to Poor & Company, Chicago, Ill., a corporation of Delaware
Filed Sept. 21, 1962, Ser. No. 225,292
1 Claim. (Cl. 305—53)

This invention relates to links for endless track used on underground mining machines and other similar types of equipment.

One of the objects of the invention is to provide a link of simple construction which readily lends itself to casting procedures, and which may be readily assembled into the form of an endless track in a manner that spaced driving sprockets engage related lugs at the ends of the link so that the maximum driving power of the sprockets is delivered to the track. That is to say, the invention contemplates a link of the type including a body having pivot eyes at opposite sides thereof and lugs located at opposite end and adapted to fit within the space of the sprocket teeth to provide smooth application of power from the sprockets to the link, while the teeth of the sprocket engage in the valleys between the lugs of adjacent links at the location of the hinge pins which connect one plate with another.

Another object of the invention is to provide a novel lug formation in the respect that the inner and outer wall of each lug is formed with a flange which extends beyond the sprocket engaging face and over a related pivot eye, thereby to provide oppositely directed flanges which restrict the lateral movement of the teeth relative to the track when the links are assembled for engagement with the sprockets.

With the above and other objects in view which will more readily appear as the nature of the invention is better understood, the same consists in the novel construction, arrangement, and combination of parts hereinafter more fully described, illustrated, and claimed.

A preferred and practical embodiment of the invention is shown in the accompanying drawings, in which:

FIG. 1 is a fragmentary elevation of a sprocket and a crawler track including links of the present invention applied thereto, one of the lugs being shown in section as per line 1ᵃ—1ᵃ of FIG. 2.

FIG. 2 is a top plan view of one of the links.

FIG. 3 is a perspective view showing an adjacent pair of links connected by pivot pins.

FIG. 4 is a horizontal cross sectional view taken on the line 4—4 of FIG. 2.

Similar reference characters designate corresponding parts throughout the several figures of the drawings.

According to the drawings, the link, designated generally as A, includes a transversely elongated body having the spaced opposite lugs B.

When the links A (FIG. 3) are assembled in crawler formation as shown in FIG. 1, the space between the teeth T of the sprockets S snugly fits the driving surfaces of the lugs B. Thus, the lugs, being centered at the ends of the body, adequately bear the full weight of the load, and, also cause the full thrust of the propulsion forces to be delivered by the sprocket in either direction of its rotation.

Referring more specifically to FIG. 2, it will be seen that each of the lugs B is provided on its inner and outer surfaces respectively with integral flanges C and C' which extend in opposite directions. The purpose of this arrangement is to restrict the lateral movement of the link with reference to the sprocket to insure full application of the load and driving force of the sprocket to the lugs B, regardless of the direction of travel. That is to say, undesirable sidewise movement of the link relative to the sprockets is held to an absolute minimum so that the maximum propulsion force of the sprocket is fully utilized for directional movement of the crawler.

The space between the inner faces of the lugs B is provided with the upstanding flanges D. These flanges D restrict the lateral movement of the track as a whole on the crawler frame between pairs of drive and idler sprockets at either end of the frame.

As will be seen from FIGS. 2 and 3, the body of each link is provided with the spaced pivot eyes E and E'. These pivot eyes E and E' are arranged in staggered relation and are provided with registering openings F to receive a pivot pin G (FIG. 3).

The bottom surface of each link is provided with an earth engaging grouser rib H, and, as will clearly appear from FIG. 4, the space between each pivot eye E and E' is hollowed out to provide recesses as indicated at K, thereby to lighten the weight of each link without sacrificing strength or durability.

From the foregoing, it will now be seen that the present invention provides a strong, sturdy, and practical form of crawler track link with relatively greater longevity because the loading and driving forces are both concentrated on a substantial part of the link, namely, the lugs, while at the same time, the links cannot shift laterally in either direction because of the oppositely directed flanges which extend across the axes of the pivot eyes.

I claim:

A crawler link for an endless track, driven by sprockets having peripheral offset teeth comprising, in combination,
a tranversely elongated body having pivot eyes projecting from opposite sides of said body,
a driving lug at each outer end of the upper face of the body and of a transverse length to span a related pair of outermost eyes,
and forwardly and rearwardly directed flanges on opposite sides of each lug to receive successive sprocket teeth therebetween, whereby, the sprocket teeth driving each lug are held against lateral movement and the space between adjacent teeth bears on the lug to insure that the full propulsion force of the sprocket is applied to the embraced lug.

References Cited in the file of this patent

UNITED STATES PATENTS

| | | |
|---|---|---|
| 1,107,874 | Appleby | Aug. 18, 1914 |
| 1,934,820 | Rorabeck | Nov. 14, 1933 |
| 1,947,883 | Snyder | Feb. 20, 1934 |
| 2,061,229 | Fergusson | Nov. 17, 1936 |
| 2,452,921 | Gillespie | Nov. 2, 1948 |
| 2,530,379 | Davidson | Nov. 21, 1950 |
| 2,745,503 | Fisher | May 15, 1956 |

FOREIGN PATENTS

| | | |
|---|---|---|
| 313,249 | Great Britain | June 13, 1929 |